United States Patent [19]
Toyoda et al.

[11] Patent Number: 5,393,603
[45] Date of Patent: Feb. 28, 1995

[54] LAMINATED RESIN SHEET AND PROCESS FOR PRODUCING THE SAME

[75] Inventors: Takashi Toyoda; Yasuji Hosono; Takashi Funato, all of Ibaraki; Takao Yazaki, Mie; Akihiko Egashira, Mie; Takumi Matuno, Mie; Tokmi Chiba, Ibaraki, all of Japan

[73] Assignee: Oji Yuki Goseishi Co., Ltd., Tokyo, Japan

[21] Appl. No.: 25,879

[22] Filed: Mar. 3, 1993

[30] Foreign Application Priority Data

Mar. 4, 1992 [JP] Japan .................................. 4-047281
Sep. 10, 1992 [JP] Japan .................................. 4-242185

[51] Int. Cl.$^6$ .............................. B32B 3/26; B32B 5/18
[52] U.S. Cl. ............................... 428/316.6; 428/317.9; 428/315.5; 428/324; 428/328; 428/331; 428/308.8
[58] Field of Search ............... 428/316.6, 308.8, 317.9, 428/323, 315.5, 324, 328, 331

[56] References Cited

U.S. PATENT DOCUMENTS

| | | | |
|---|---|---|---|
| 4,318,950 | 3/1982 | Takashi et al. | 428/316.6 |
| 4,472,227 | 9/1984 | Toyoda et al. | 156/244.11 |
| 4,578,297 | 3/1986 | Duncan . | |
| 4,701,369 | 10/1987 | Duncan | 428/316.6 |
| 4,704,323 | 11/1987 | Duncan et al. | 428/316.6 |
| 4,911,978 | 3/1990 | Tsubone et al. | 428/317.7 |

FOREIGN PATENT DOCUMENTS 0344726 12/1989 European Pat. Off. .
2099754A 12/1982 United Kingdom .

*Primary Examiner*—George F. Lesmes
*Assistant Examiner*—Blaine R. Copenheaver
*Attorney, Agent, or Firm*—Oblon, Spivak, McClelland, Maier & Neustadt

[57] ABSTRACT

A laminated resin sheet comprising (A) a laminated base material composed of ($A^1$) an expanded resin layer and ($A^2$) a non-expanded resin layer obtained by co-extrusion of ($a^1$) a blowing agent-containing thermoplastic resin and ($a^2$) a filler-containing thermoplastic resin containing 9 to 80% by weight of a filler through a T die, having laminated on at least one side thereof (B) synthetic paper comprising a stretched porous thermoplastic resin film containing an inorganic filler. The laminated resin sheet is light and highly rigid and exhibits a beautiful appearance with satisfactory printability and is therefore useful as various display materials and thermoformable sheeting for food trays, etc.

17 Claims, 1 Drawing Sheet

LAMINATED RESIN SHEET AND PROCESS FOR PRODUCING THE SAME

FIELD OF THE INVENTION

This invention relates to a light and rigid laminated resin sheet having a beautiful appearance and good printability and to a process for producing the same. The invention laminated sheet is particularly useful as a display material, such as a signboard, or as a thermoforming material for food trays, etc.

BACKGROUND OF THE INVENTION

Thermoformed articles (vacuum formings, pressure air formings, and matched-die moldings) made from polyolefin resin sheets containing an inorganic filler are used as various food containers or as industrial parts (see, e.g., JP-A-52-63283 and JP-B-3-20331, the term "JP-A" as used herein means an "unexamined published Japanese patent application", and the term "JP-B" as used herein means an "examined published Japanese patent application"). These thermoformed articles have advantages such as high rigidity, high heat resistance, and a low heat of combustion but have the disadvantage of being heavy due to the inorganic filler (the density ranges from 1.1 to 1.5 g/cm$^3$). Besides the heaviness of these articles, inorganic filler containing polyolefin resin sheets exhibit poor ink receptivity and/or unclear, poor printability when subjected to offset printing.

Synthetic paper having excellent offset printability and gravure printability include laminated resin sheets comprising a biaxially stretched finely porous thermoplastic resin film as a base layer having laminated thereon a uniaxially stretched thermoplastic resin film containing an inorganic fine powder as a paper-like layer is known and disclosed in, e.g., JP-B-46-40794, U.S. Pat. No. 4,318,950, JP-B-50-29738, JP-A-54-74842, JP-A-56-141339, and U.S. Pat. No. 4,420,530.

Synthetic paper with opaqueness and a pearly luster attributed to light scattering due to voids therein is also known, comprising a biaxially stretched film of a thermoplastic resin containing an inorganic filler, e.g., calcium carbonate, or a blend of a thermoplastic resin and an incompatible resin, e.g., polyamide, polyethylene terephthalate, or polyoxymethylene (see JP-A-61-157547, U.S. Pat. No. 4,191,719, JP-B-60-37793, and U.S. Pat. No. 3,773,608). A void formation technique utilizing the crystal morphology inherent in polypropylene is also known (see JP-B-55-40411).

When conventional synthetic papers like those described above are used for applications demanding high rigidity (coin cases, signboards to be set up, or hanging signs) a plurality of sheets of the synthetic paper each 30 to 300 μm thick must be bonded together to obtain the necessary thickness, making the resulting laminated article extremely expensive. Further, since each synthetic paper sheet to be laminated has already been oriented, the thick and rigid laminated sheet undergoes shrinkage on heating during thermoforming and often slips out of the sheet feeding chain. Where the sheet is clamped so as not to slip out, the sheet itself tends to break. If thermoforming of the thick laminated sheet is effected with heating at a relatively low temperature so as to prevent thermal shrinkage, the draw of the sheet is insufficient for obtaining a shaped article.

SUMMARY OF THE INVENTION

An object of the present invention is to provide a thermoplastic resin sheet which is light and rigid and has good printability and good thermoformability.

The above object of the present invention is accomplished by providing a laminated resin sheet comprising (A) a laminated base material composed of (A$^1$) an expanded resin layer and (A$^2$) a non-expanded resin layer obtained by co-extrusion of (a$^1$) a blowing agent-containing thermoplastic resin and (a$^2$) a filler-containing thermoplastic resin containing 9 to 80% by weight of a filler through a T die, having laminated on at least one side thereof (B) synthetic paper comprising a stretched porous thermoplastic resin film containing an inorganic filler.

The laminated resin sheet according to the present invention includes the following four embodiments.

A first embodiment relates to a laminated resin sheet having a thickness of from 60 to 5,000 μm, comprising (A) a laminated base material composed of (A$^1$) an expanded resin layer and (A$^2$) a non-expanded resin layer, said laminated base material (A) being obtained by co-extrusion of (a$^1$) a thermoplastic resin containing a blowing agent and (a$^2$) a thermoplastic resin containing from 9 to 80% by weight of a filler through a T die, having laminated on at least one side thereof (B) void-containing synthetic paper comprising a stretched film of a thermoplastic resin containing an inorganic filler.

A second embodiment relates to a laminated resin sheet having a thickness of from 60 to 5,000 μm, comprising (A) a laminated base material composed of (A$^1$) an expanded resin layer and (A$^2$) a non-expanded resin layer, said laminated base material (A) being obtained by co-extrusion of (a$^1$) a thermoplastic resin containing a blowing agent and (a$^2$) a thermoplastic resin containing from 9 to 80% by weight of a filler through a T die, having laminated on at least one side thereof (B) void-containing synthetic paper having a thickness of from 10 to 300 μm and comprising a biaxially stretched film of a thermoplastic resin containing from 8 to 65% by weight of an inorganic filler in such a manner that the void-containing synthetic paper (B) is positioned as the outermost layer of the laminated resin sheet.

A third embodiment relates to a laminated resin sheet having a thickness of from 100 to 5,000 μm, comprising (A) a laminated base material composed of (A$^1$) an expanded resin layer and (A$^2$) a non-expanded resin layer, said laminated base material (A) being obtained by co-extrusion of (a$^1$) a thermoplastic resin containing a blowing agent and (a$^2$) a thermoplastic resin containing from 9 to 80% by weight of a filler through a T die, having laminated on at least one side thereof (B) composite synthetic paper having a thickness of from 50 to 500 μm which is composed of (B$^1$) a biaxially stretched thermoplastic resin film having fine voids as a base layer and (B$^2$) a uniaxially stretched thermoplastic resin film containing from 0.1 to 65% by weight of an inorganic filler as a paper-like layer in such a manner that the uniaxially stretched thermoplastic resin film (B$^2$) is positioned as the outermost layer of the laminated resin sheet.

A forth embodiment relates to a process for producing a laminated resin sheet comprising melt-kneading (a$^1$) an expandable resin comprising a thermoplastic resin and a blowing agent and (a$^2$) a non-expandable resin comprising a thermoplastic resin and a filler in separate extruders, leading the resins (a$^1$) and (a$^2$) to a T die, co-extruding the resins ($a^1$) and ($a^2$) from the T die, and, while the co-extruded laminated base material (A) sheet is in a molten state, bonding (B) void-containing synthetic paper comprising a stretched film of a thermoplastic resin containing an inorganic filler to at least one side of said co-extruded laminated base material (A) sheet by fusion bonding under pressure by means of a metal roll or a rubber roll.

The above embodiments include laminated sheets wherein laminated base (A) has a three layer sandwich structure of ($A^2$)/($A^1$)/($A^2$).

DETAILED DESCRIPTION OF THE INVENTION

Figure 1:
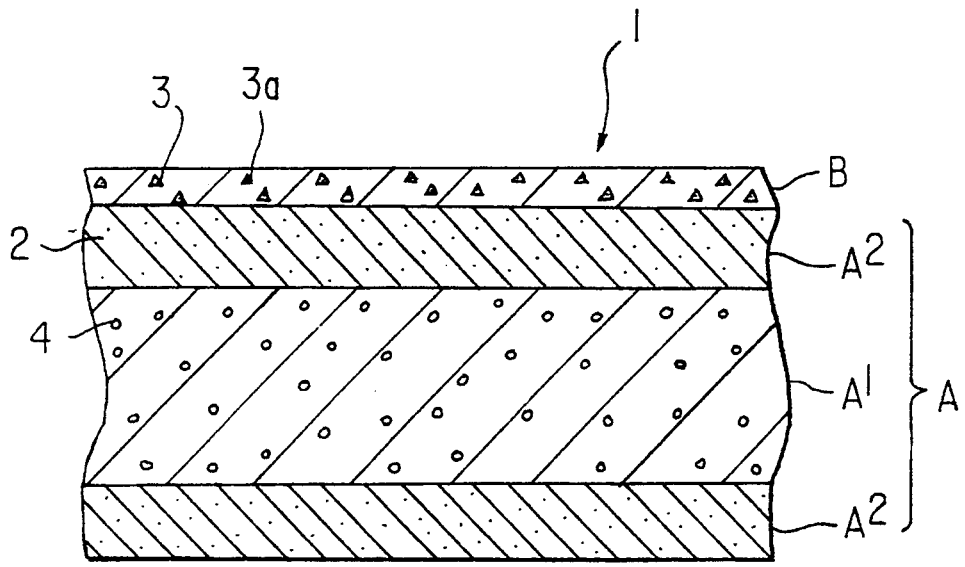
FIGS. 1 and 2 each illustrate a schematic cross section of the laminated resin sheet according to the present invention.
Figure 2:
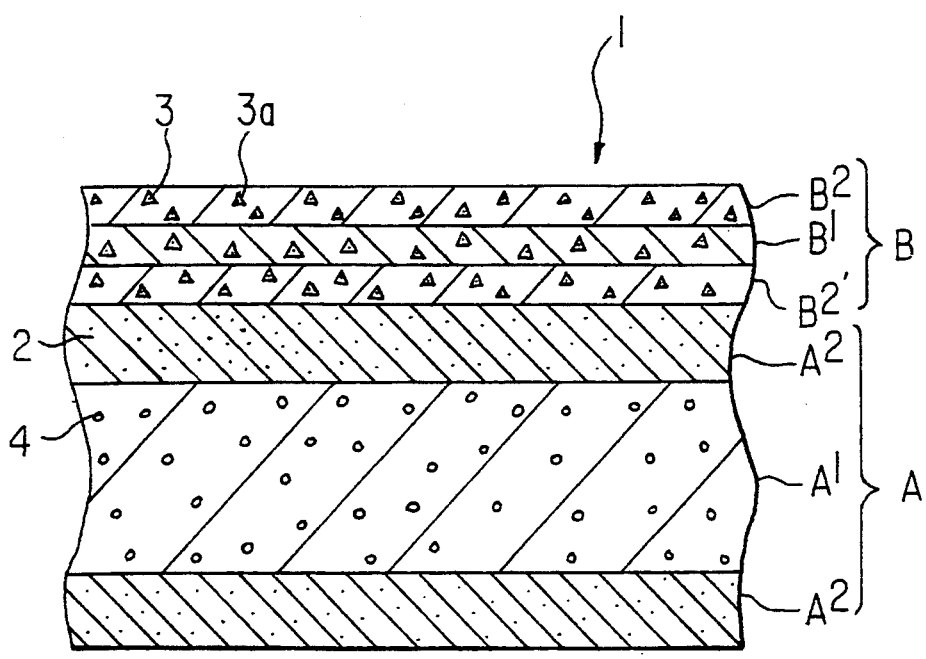

The laminated resin sheet 1 of the present invention comprises synthetic paper (B) containing fine voids 3 (a stretched film of an inorganic filler-containing thermoplastic resin) and laminated base material (A) (composed of filler-containing non-expanded resin layer ($A^2$) and expanded resin layer ($A^1$)) as shown in FIGS. 1 or 2, obtained by bonding synthetic paper (B) to one or both sides of base material (A).

Synthetic paper (B) includes (B-1) single-layered synthetic paper (shown in FIG. 1) having a thickness of from 10 to 300 $\mu$m which is obtained by biaxially stretching a thermoplastic resin film containing from 8 to 65% by weight of an inorganic filler to thereby form fine and rugby ball-shaped voids 3 around the inorganic filler particles; and (B-2) composite synthetic paper (shown in FIG. 2) having a thickness of from 50 to 500 $\mu$m, composed of a biaxially stretched thermoplastic resin film having fine voids 3 as base layer ($B^1$) and a uniaxially stretched thermoplastic resin film containing from 0.1 to 65% by weight of an inorganic filler as paper-like layer ($B^2$).

Laminated base material (A) is composed of expanded resin layer ($A^1$) and non-expanded resin layer ($A^2$), obtained by melt-kneading expandable resin ($a^1$) containing a chemical or physical blowing agent and non-expandable resin ($a^2$) containing filler 2 in separate extruders, feeding resins ($a^1$) and ($a^2$) to a T die, and co-extruding resins ($a^1$) and ($a^2$) in a laminated form through the T die while causing expansion, followed by cooling. From the standpoint of co-extrusion properties and fabricability in perforating or cutting, it is preferable to laminate non-expanded resin layer ($A^2$) on both sides of expanded resin layer ($A^1$).

The thermoplastic resins which can be used in expandable resin ($a^1$) and non-expandable resin ($a^2$) include olefin resins, e.g., low-, middle- to high-density polyethylene, linear low-density polyethylene, polypropylene, an ethylene-propylene copolymer, an ethylene-propylene-butene-1 copolymer, a propylene-butene-1 copolymer, a propylene-4-methylpentene-1 copolymer, and an ethylene-vinyl acetate copolymer; styrene resins, e.g., polystyrene, an acrylonitrile-styrene copolymer, and an acrylonitrile-butadiene-styrene copolymer; polyethylene terephthalate, polyamide, polyphenylene sulfide, polyphenylene ether, and so forth. These thermoplastic resins may be used either individually or in combination of two or more thereof.

The chemical blowing agent which can be used in expandable resin ($a^1$) includes azodicarbonamide, azobisisobutyronitrile, diazoaminobenzene, N,N'-dinitrosopentamethylenetetramine, N,N'-dimethyl-N,N'-dinitroterephthalamide, benzenesulfonyl hydrazide, p-toluenestyrenesulfonyl hydrazide, p,p'-hydroxybisbenzenesulfonyl hydrazide, sodium hydrogencarbonate, monosodium citrate, etc.; and mixtures thereof.

The physical blowing agent which can be used in expandable resin ($a^1$) includes propane, butane, pentane, dichlorodifluoromethane, dichloromonofluoromethane, and trichloromonofluoromethane.

These blowing agents may be used in combination with generally employed additives, such as an expansion assistant, a crosslinking agent, and a nucleating agent. The expanded resin may be a crosslinked expanded resin.

Filler 2 which can be used in non-expandable resin ($a^2$) includes inorganic fillers and organic fillers. The inorganic fillers include calcium carbonate, magnesium carbonate, calcium hydroxide, magnesium hydroxide, aluminum hydroxide, aluminum phosphate, talc, mica, clay, carbon black, graphite, zeolite, barium sulfate, hydrated calcium silicate, diatomaceous earth, titanium oxide, aluminum sulfate, and silica, each having a particle size of from 0.05 to 30 $\mu$m. The organic fillers to be used are resin particles having a particle size of from 0.5 to 2,000 $\mu$m which are incompatible with the above-mentioned thermoplastic matrix resin. Examples of such incompatible resins include thermosetting resin fillers, such as phenolic resin particles and ebonite particles. Polyamide, polybutylene terephthalate, etc. may also be used for a polypropylene or polyethylene matrix resin.

Besides the above-mentioned particulate fillers, fibrous fillers made of glass, pulp, asbestos, polyethylene terephthalate, polyamide, etc., having a diameter of from 3 to 30 $\mu$m and a length of from 1 to 10 mm can also be used.

If desired, expandable resin ($a^1$) and filler-containing non-expandable resin ($a^2$) may further contain other additives, such as antioxidants, colorants, ultraviolet absorbents, antistatic agents, dispersing agents, nucleating agents, plasticizers, and slip agents (e.g., fatty acid metal salts and fatty acid amides).

Expanded resin layer ($A^1$) is a layer containing voids 4 formed by expansion of the blowing agent of expandable resin ($a^1$). A suitable expansion ratio ranges from 1.05 to 30, and preferably from 1.1 to 10. If the expansion ratio is smaller than 1.05, weight reduction of laminated base material (A) is insufficient. If it exceeds 30, the rigidity of laminated base material (A) will be considerably reduced.

The content of the filler in non-expandable resin ($a^2$) or non-expanded resin layer ($A^2$) ranges from 9 to 80% by weight, and preferably from 15 to 60% by weight. If it is less than 9% by weight, laminated base material (A) not only has reduced rigidity but undergoes considerable corrugated deformation due to expansion during co-extrusion. As a result, non-uniform cooling of laminated base material (A) occurs, causing streaks parallel to the machine direction. When synthetic paper (B) is thermally laminated on such corrugated laminated base material (A), wrinkles or pocks develop. If the filler content exceeds 80% by weight, non-expandable resin ($a^2$) has an excessive melt viscosity and a significantly reduced flow, making co-extrusion difficult.

Laminated base material (A) can be formed by laminating expandable resin layer ($A^1$) and non-expandable resin layer ($A^2$) in a molten state before being co-extruded from a T die. In general, both expandable resin and non-expandable resin are melted and kneaded in the separate extruder and then laminated in a T die (multi-manifold process) or laminated before being fed to a T die (feed block process). Co-extrusion through the T die is accompanied by corrugation of the sheeting, and it is preferable to laminate non-expanded resin layer (A²) on both sides of expanded resin layer (A¹).

Expansion of expandable resin (a¹) is performed simultaneously with the laminating of expanded resin layer (A¹) and non-expanded resin layer (A²) to form voids 4 in expanded resin layer (A¹) (see FIGS. 1 and 2). A preferred expansion ratio is as described above.

Laminated base material (A) preferably has a thickness of from 50 to 4,900 μm, and particularly from 50 to 3,000 μm. The thickness ratio of expanded resin layer (A¹) and non-expanded resin layer (A²) varies depending on the resins used and the expansion ratio. In general, the thickness of non-expanded resin layer (A²) is in the range of from about 5 to about 70%, and preferably from 5 to 50%, based on the total thickness of laminated base material (A).

Synthetic paper (B) includes (B-1) a biaxially stretched thermoplastic resin film containing from 8 to 65% by weight of an inorganic filler and thereby containing fine voids and (B-2) a composite synthetic paper composed of base layer (B¹) comprising a biaxially stretched thermoplastic resin film having fine voids having laminated on one or both sides thereof paper-like layer (B²) or (B²and B²′, sometimes inclusively designated B²) comprising a uniaxially stretched thermoplastic resin film containing from 0.1 to 65% by weight of an inorganic filler.

The thermoplastic resins which can be used in synthetic paper (B), either single-layered or multi-layered, include propylene resins, e.g., polypropylene, a propylene-ethylene copolymer, a propylene-ethylene-butene-1 copolymer, a propylene-butene-1 copolymer, and a propylene-4-methylpentene-1 copolymer; ethylene resins, e.g., linear low-density polyethylene, high-density polyethylene, an ethylene-propylene copolymer, an ethylene-butene-1 copolymer, and an ethylene-4-methylpentene-1 copolymer; polyethylene terephthalate, polyamide resins (e.g., nylon 6, nylon 6,6, nylon 6,10, and nylon 6,12), polystyrene, and the like. Mixtures may be used.

The inorganic filler 3a which can be used in synthetic paper (B), either single-layered or multi-layered, includes ground calcium carbonate, calcined clay, vermiculite, titanium oxide, barium oxide, silica, talc, mica, and diatomaceous earth. The inorganic filler usually has a particle size of from 0.03 to 15 μm, and preferably from 0.1 to 5 μm, and mixtures of these materials may be used.

Synthetic paper (B-1) comprising a fine porous film (shown in FIG. 1) is a biaxially stretched thermoplastic resin film having a thickness of from 10 to 300 μm and containing fine and rugby ball-shaped voids 3, which is obtained by stretching a thermoplastic resin film containing from 8 to 65% by weight, and preferably from 10 to 30% by weight, of an inorganic filler at a temperature below the melting point of the resin at a stretch ratio of from 3.5 to 10, and preferably from 4 to 7, in the machine direction and at a stretch ratio of from 3.5 to 20, and preferably from 4 to 12, in the transverse direction.

Synthetic paper (B-2) having a multi-layer structure (shown in FIG. 2) is a composite film having a total thickness of from 50 to 500 μm, composed of (B¹) a biaxially stretched thermoplastic resin film having fine and rugby ball-shaped voids 3 as a base layer obtained by stretching a thermoplastic resin film containing from 5 to 45% by weight, and preferably 10 to 30% by weight, of an inorganic filler 3a at a temperature below the melting point of the resin at a stretch ratio of from 3.5 to 10, and preferably from 4 to 7, in the machine direction and at a stretch ratio of from 3.5 to 20, and preferably from 4 to 12, in the transverse direction and (B²) a uniaxially stretched thermoplastic resin film as a paper-like layer, obtained by uniaxially stretching a thermoplastic resin film containing from 0.1 to 65% by weight, and preferably from 8 to 55% by weight, of an inorganic filler 3a at a temperature below the melting point of the resin at a stretch ratio of from 3.5 to 20, and preferably from 4 to 12, said paper-like layer (B²) being laminated on one or both sides of said base layer (B¹). With the inorganic filler content in paper-like layer (B²) being 0.1 to 65% by weight, layer (B²) contains therein fine, long and narrow voids 3 and has fine cracks on the surface thereof provide excellent printability and writability.

It is preferable that synthetic paper (B) has a void content of from 10 to 60%, and particularly from 15 to 50%, as calculated according to equation:

$$\text{Void Content (\%)} = (\rho_0 - \rho)/\rho_0 \times 100$$

wherein $\rho_0$ is a density of the unstretched film; and $\rho$ is a density of the stretched film.

Synthetic paper (B) having the above-specified void content has a reduced weight (density) while retaining strength. For example, synthetic paper (B-1) with a void content of 10% to 60% has a density of from 0.50 to 1.0 g/cm³, and composite synthetic paper (B-2) with the same void content has a density of from 0.68 to 1.1 g/cm³.

While the above-mentioned synthetic paper (B-1) has been explained as having a single-layered structure, this does not mean to exclude any modification so as to have a laminate structure composed of two or more biaxially stretched films (B-1). Further, synthetic paper (B-1) may have on the back side thereof (i.e., the side facing base (A)) a heat sealable layer made of a low-melting resin, such as a propylene-ethylene copolymer, a metal (e.g., Na, Li, Zn or K) salt of an ethylene-(meth)acrylic acid copolymer, or chlorinated polyethylene.

While depending on the desired end use, synthetic paper (B-1) usually has a thickness of from 10 to 300 μm, preferably from 30 to 200 μm, with the thickness of laminated base material (A) preferably ranging from 50 to 4,900 μm, particularly from 50 to 3,000 μm, as previously specified. If laminated base material (A) has a thickness less than 50 μm, it has a rough surface and reduced surface smoothness. If synthetic paper (B-1) is less than 10 μm, roughness remains on the surface thereof even after fusion bonding to laminated base material (A), resulting in a poor appearance or deteriorated printability. Accordingly, for the sake of quality, it is preferable that laminated base material (A) and synthetic paper (B-1) have a thickness of 50 μm or more and 10 μm or more, respectively, and laminated resin sheet 1 has a thickness of 60 μm or more.

While synthetic paper (B-2) has been explained as having a double-layered structure composed of base layer (B¹) and paper-like layer (B²) or a triple-layered structure having paper-like layers (B²) and (B²′) on each side of base layer (B¹) (see JP-B-46-40794 and U.S. Pat.

Nos. 4,318,950 and 4,420,530), this does not mean to exclude any modification so as to have a triple- to heptaple layer structure having other resin film or films ($B^3$) between paper-like layer ($B^2$) or ($B^{2'}$) and base layer ($B^1$) (see JP-B-50-29738, JP-B-57-149363, JP-B-56-126155, and JP-B-57-181829). Further, synthetic paper (B-2) may have on back side thereof (i.e., the side facing base (A)) a heat sealable layer made of a resin having a lower melting point than that of the resin of base layer ($B^1$), such as a propylene-ethylene copolymer, a metal (e.g., Na, Li, Zn or K) salt of an ethylene-(meth)acrylic acid copolymer, or chlorinated polyethylene. Synthetic paper (B-2) having these layer structures are known as disclosed in the above cited references, and commercially available synthetic paper products, such as "Yupo FPG", "Yupo KPK", and "Yupo SGG", all produced by Oji Yuka Goseishi Co., Ltd., may be utilized.

Synthetic paper (B-2) usually has a thickness of from 50 to 500 μm, and preferably from 50 to 300 μm, with its base layer ($B^1$) having a thickness of from 20 to 500 μm, preferably from 50 to 200 μm, and its paper-like layer ($B^2$) or ($B^{2'}$) having a thickness of from 0.5 to 100 μm, preferably from 0.5 to 50 μm. From the viewpoint of lightness and rigidity, the thickness of base layer ($B^1$) preferably ranges from 40 to 99%, and particularly from 50 to 80%, based on the total thickness of the composite synthetic paper (B-2).

While depending upon the desired end use, if laminated base material (A) has a thickness less than 50 μm, it has a rough surface and reduced surface smoothness. If synthetic paper (B-2) is less than 50 μm, roughness remains on the surface of synthetic paper (B-2) even after fusion bonding to laminated base material (A), resulting in a poor appearance or deteriorated printability. Accordingly, for the sake of quality, it is preferable that laminated base material (A) and synthetic layer (B-2) have a thickness of 50 μm or more and 50 μm or more, respectively, and laminated resin sheet 1 has a thickness of 100 μm or more.

Laminated base material (A) and synthetic paper (B) are then laminated to obtain laminated resin sheet 1 according to the present invention. Any corrugation occurring during thermal laminating may be minimized by adhering synthetic paper (B) on the side of non-expanded resin layer ($A^2$) of laminated base material (A).

Laminated resin sheet 1, being composed of the above-mentioned laminated base material (A) and synthetic paper (B) and, if desired, an adhesive layer hereinafter described, usually has a thickness of from 60 to 5,000 μm, preferably from 250 to 3,000 μm using synthetic paper (B-1), and usually has a thickness of from 100 to 5,000 μm, preferably from 300 to 3,000 μm using synthetic paper (B-2).

Synthetic paper (B) is laminated on one or both sides of laminated base material (A) to form an integral laminated resin sheet with synthetic paper (B) as an outer surface layer. When synthetic paper (B-2) is laminated on one or both sides of laminated base material (A), an integral laminated resin sheet with its paper-lake layer ($B^2$) as an outer surface layer is formed. It is preferably laminated on the side of non-expanded resin layer ($A^2$) of laminated base material (A). This being the case, corrugation on thermal laminating can be minimized by the presence of filler.

Adhesion of synthetic paper (B) to laminated base material (A) may be carried out, for example, by bonding the two layers under pressure making use of the heat of the co-extruded laminated base material (A) while molten (thermal laminating). Adhesion of laminated base material (A) and synthetic paper (B) may also be effected with a hot-melt adhesive or a solvent-based adhesive (adhesive bonding). In the latter case, a known hot-melt adhesive layer may be provided on non-expanded resin layer ($a^2$) by co-extrusion, or synthetic paper (B) having a hot-melt adhesive layer thereon may be used. Taking into consideration improved productivity and thickness uniformity of the resulting laminated resin sheet, the thermal laminating method is preferred since no coating step is needed.

The thermal laminating is carried out while the co-extruded laminated base material (A) is at a temperature of from 150° to 280° C., preferably from 160° to 220° C., at which temperature laminated base material (A) retains its molten state, under a pressure usually of from 0.1 to 60 kg/cm, preferably of from 0.2 to 10 kg/cm, by means of a metal roll or a rubber roll.

In the case of adhesive bonding, the hot-melt adhesives to be used include low-density polyethylene, linear low-density polyethylene, an ethylene-vinyl acetate copolymer (preferably having a vinyl acetate content of not more than 12% by weight), an ethylene-acrylic acid copolymer (preferably having an ethylene content of from 65 to 94% by weight), an ethylene-alkyl methacrylate copolymer, an ionomer (e.g., a metal salt of an ethylene-(meth)acrylic acid copolymer), an ethylene-propylene copolymer, an ethylene-propylene-butene-1 copolymer, and a vinyl chloride-vinyl acetate copolymer.

Solvent-based adhesives to be used in adhesive bonding include a polyether polyol-polyisocyanate adhesive and a polyester polyol-polyisocyanate adhesive.

The adhesive layer usually has a thickness of from 1 to 30 μm, and preferably from 1 to 20 μm, which corresponds to an adhesive spread of from 1 to 20 g/m$^2$, and preferably from 2 to 6 g/m$^2$. The hot-melt adhesive is extrusion coated to a thickness of from 8 to 30 μm, and preferably from 8 to 20 μm.

The laminated resin sheet according to the present invention is light and highly rigid and exhibits a beautiful appearance and good printability and is therefore useful as a display material, such as signs which are set up or hung, and thermoformable sheeting for food trays or industrial parts and trays.

The present invention will now be illustrated in greater detail with reference to the following Examples, but it should be understood that the present invention is not construed as being limited thereto. All the percents, parts, and ratios are by weight unless otherwise indicated.

Physical properties and performance properties of the laminated resin sheets obtained in Examples and Comparative Examples were evaluated as follows.

1) Modulus of Elasticity in Three-Point Bending:

Measured according to JIS K-7203 by use of an autographic recording device "DSC-2000" manufactured by Shimazu Seisakusho. MD and TD are reported which refer to the machine direction and the transverse direction, respectively.

2) Surface Gloss:

Gloss (75°) of the surface layer of the laminated resin sheet was measured in accordance with JIS P-8142 by use of a glossmeter "UGV-5DP" manufactured by Suga Sikenki K.K.

3) Appearance:

The surface conditions (streaks due to corrugation, wrinkles due to laminating, development of pocks, etc.) were visually observed and judged according to the following standard.

Good—No problem for practical use
    Medium—Slight problem for practical use
    Poor—Unacceptable for practical use 4) Printability:

Four color (black, blue, red, and yellow) litho offset printing was conducted on the surface side of the laminated resin sheet by use of an offset four-color printing machine manufactured by Komori Insatsuki K.K. and an offset printing inks "TSP-400" produced by Toyo Ink K.K.

4-1) Ink Receptivity:

Dot reproducibility of the dot image printed in each color was observed with a naked eye through a 30x magnifier to evaluate ink receptivity according to the following standard.

Good—Dot reproducibility of from 75 to 100%
    Medium—Dot reproducibility of from 50 to 75%
    Poor—Dot reproducibility of up to 50%

4-2) Ink Adhesion:

An adhesive tape "Cellotape" produced by Nichiban Co., Ltd. was firmly adhered on the printed surface and rapidly stripped off along the printed surface. The ink retention on the laminated resin sheet was observed with a naked eye to evaluate ink adhesion according to the following standard.

Good—Ink retention of 95 to 100%
    Medium—Ink retention of 80 to 95%
    Poor—Ink retention of up to 80%

5) Expansion Ratio:

The expansion ratio of the expanded resin layer ($A^1$) of laminated base material (A) was obtained from equation:

$$\text{Expansion Ratio} = \frac{\text{Density of Expandable Resin Layer}}{\text{Density of Expanded Resin Layer}}$$

6) Thermoformability:

The laminated resin sheet was thermoformed as follows by means of a vacuum forming machine with a pressure air ("Cosmic FLX-04" manufactured by Asano Kenkyusho K.K.).

The sheet was heated with an infrared heater to a sheet surface temperature of 165° to 175° C. and vacuum-formed on a vacuum mold having a shape of a tray (195 mm × 100 mm × 25 mm (depth); stretch ratio of surface: 1.76).

The shape reproducibility of the resulting tray as observed with a naked eye was evaluated according to the following standard.

Good—The shape of the mold was 100% reproduced.
    Medium—The corners of the mold were not reproduced.
    Poor—The whole shape of the mold was not reproduced.

EXAMPLE 1

Preparation of Composite Synthetic Paper (B)

Composition (A) comprising 81% of polypropylene having a melt flow rate (MFR) of 0.8 g/10 min (melting point: about 164° to 167° C.), 3% of high-density polyethylene, and 16% of calcium carbonate having an average particle size of 1.5 μm was kneaded in an extruder set at 270° C., extruded into sheeting, and cooled in a cooling apparatus to obtain an unstretched sheet.

The sheet was heated to 150° C. and stretched 5 times in the machine direction to obtain a 5-fold stretched film.

Composition (B) comprising 54% of polypropylene having an MFR of 0.4 g/10 min (melting point: about 164° to 167° C.) and 46% of calcium carbonate having an average particle size of 1.5 μm was kneaded in a separate extruder at 210° C., extruded into sheeting through a die, and laminated on both sides of the above prepared 5-fold stretched film to obtain a three-layered laminated film.

The laminated film was cooled to 60° C., reheated up to about 155° C., stretched 7.5 times in the transverse direction by means of a tenter, subjected to annealing at 165° C., cooled to 60° C., and trimmed to obtain composite synthetic paper (B) having a three layer structure (uniaxially stretched film B/biaxially stretched film A/uniaxially stretched film B), a total thickness of 50 μm (B/A/B = 12 μm/26 μm/12 μm), and a void content of 33%.

Application of Solvent-based Adhesive

Both sides of the synthetic paper (B) were subjected to a corona discharge, and an antistatic agent-containing aqueous coating solution having the following composition was coated on each side to a single spread of 0.05 g/m² as converted to a dry basis (total coating thickness: about 0.1 μm) and dried. The dried synthetic paper was wound.

Composition of Coating Solution

| | |
|---|---|
| Aqueous solution of an antistatic acrylic polymer having a moiety shown below in the molecular chain ("ST-1100" produced by Mitsubishi Petrochemical Co., Ltd.) | 100 parts |
| $$-CH_2-\underset{\underset{CH_3}{|}}{C}HCOOC_2H_4\overset{\overset{CH_2COOK}{|}}{N^+}\underset{\underset{CH_3}{|}}{-}CH_3 \quad Cl^-$$ | |
| Epichlorohydrin adduct of water-soluble polyamine-polyamide ("KYMEN 557H" produced by Dick Hercules INC.) | 25 parts |

Printing

A pattern was printed in multiple colors on the surface of the composite synthetic paper having been coated with the adhesive (thickness: 50.1 μm) by litho offset printing.

Preparation of Laminated Base Material (A)

A hundred parts of a propylene-ethylene block copolymer (MFR: 0.5 g/10 min) ("MITSUBISHI POLYPRO EC9" produced by Mitsubishi Petrochemical Co., Ltd.) were compounded with 3.5 parts of a 1:1 mixture of monosodium citrate and sodium hydrogencarbonate as a chemical blowing agent to prepare expandable resin ($a^1$). Resin ($a^1$) was melt-kneaded in an extruder (diameter: 65 mm).

Separately, a propylene-ethylene block copolymer (MFR: 1.8 g/10 min) ("MITSUBISHI POLYPRO BC8" produced by Mitsubishi Petrochemical Co., Ltd.) was compounded with 40% of talc as a filler to prepare non-expandable resin ($a^2$). Resin ($a^2$) was melt-extruded in an extruder (diameter: 90 mm) at 210° C.

Resins ($a^1$) and ($a^2$) were laminated with ($a^1$) as an intermediate layer and ($a^2$) as an outer layer on each side according to a feed block process, and the three layers were co-extruded from a T die having a 750 mm wide slit thereby causing the intermediate layer to expand to obtain laminated base material (A) having a total thickness of 400 μm, with the thickness of non-expanded resin layers ($A^2$) each being 100 μm, and that of expanded resin layer ($A^1$) 200 μm.

Preparation of Laminated Resin Sheet

While laminated base material (A) extruded from the T die maintained a soft state, i.e., by the time when the temperature of laminated base material (A) decreased below 180° C. composite synthetic paper (B) was bonded to both sides thereof by thermal laminating. There was thus obtained a laminated resin sheet composed of composite synthetic paper (B)/laminated base material (A) (expansion ratio of expanded resin layer ($A^1$): 1.5)/composite synthetic paper (B) having a total thickness of 500.2 μm ((B)/(A)/(B)=50.1 μm/400 μm/0.1 μm).

The resulting laminated resin sheet was evaluated according to the above-mentioned methods. The results obtained are shown in Table 1 below.

EXAMPLE 2

A laminated resin sheet (thickness: 450.1 μm) was prepared in the same manner as in Example 1, except that composite synthetic paper (B) was thermally laminated on only one side of laminated base material (A). The results of evaluation are shown in Table 1.

EXAMPLE 3

A laminated resin sheet was prepared in the same manner as in Example 1, except that composite synthetic paper (B) prepared as follows was used. The results of evaluation are shown in Table 1.

Preparation of Composite Synthetic Paper (B)

Composition (A) comprising 81% of polypropylene having a melt flow rate (MFR) of 0.8 g/10 min (melting point: about 164° to 167° C.), 3% of high-density polyethylene, and 16% of calcium carbonate having an average particle size of 1.5 μm was kneaded in an extruder set at 270° C. extruded into sheeting, and cooled in a cooling apparatus to obtain an unstretched sheet.

The sheet was heated to 140° C. and stretched 5 times in the machine direction to obtain a 5-fold stretched film.

Composition (B) comprising 54% of polypropylene having an MFR of 4.0 g/10 min (melting point: about 164° to 167° C.) and 46% of calcium carbonate having an average particle size of 1.5 μm was kneaded in a separate extruder, extruded into sheeting through a die, and laminated on both sides of the above prepared 5-fold stretched film to obtain a three-layered laminated film.

The laminated film was cooled to 60° C., reheated up to about 160° C., stretched 7.5 times in the transverse direction by means of a tenter, subjected to annealing at 165° C., cooled to 60° C., and trimmed to obtain composite synthetic paper (B) having a three layer structure (uniaxially stretched film B/biaxially stretched film A/uniaxially stretched film B), a total thickness of 95 μm (B/A/B=24 μm/48 μm/23 μm), and a void content of B/A/B=30%/33.7%/30%.

EXAMPLE 4

Preparation of Laminated Base Material (A)

Expandable resin ($a^1$) comprising 100 parts of linear low-density ethylene polymer having an MFR of 0.7 g/10 min ("MITSUBISHI POLYETHY UE 320" produced by Mitsubishi Petrochemical Co., Ltd.) and 2 parts of azodicarbonamide as a chemical blowing agent was melt-kneaded in an extruder having a diameter of 65 mm. Separately, non-expandable resin ($a^2$) comprising 30% of a propylene-ethylene block copolymer having an MFR of 1.8 g/10 min ("MITSUBISHI POLYPRO BC8"), 50% of the same linear low-density ethylene polymer as used in resin ($a^1$), and 20% of talc as a filler was melt-kneaded in an extruder having a diameter of 90 mm. Resins ($a^1$) and ($a^2$) were laminated with the former as an intermediate layer and the latter as an outer layer on both sides according to a feed block process and co-extruded from a T die having a slit width of 750 mm to cause the intermediate layer to expand. There was obtained laminated base material (A) composed of non-expanded resin layer ($A^2$)/expanded resin layer ($A^1$) (expansion ratio: 1.5)/non-expanded resin layer ($A^2$) having a total thickness of 1800 μm ($A^2/A^1/A^2$=300 μm/1200 μm/300 μm).

Preparation of Composite Synthetic Paper (B)

Composition (A) comprising 81% of polypropylene having a melt flow rate (MFR) of 0.8 g/10 min (melting point: about 164° to 167° C.), 3% of high-density polyethylene, and 16% of calcium carbonate having an average particle size of 1.5 μm was kneaded in an extruder set at 270° C., extruded into sheeting, and cooled in a cooling apparatus to obtain an unstretched sheet.

The sheet was heated to 145° C. and stretched 5 times in the machine direction to obtain a 5-fold stretched film.

Composition (B) comprising 54% of polypropylene having an MFR of 4.0 g/10 min (melting point: about 164° to 167° C.) and 46% of calcium carbonate having an average particle size of 1.5 μm and composition (C) comprising 97% of polypropylene having an MFR of 4 g/10 min and 3% of titanium oxide were each kneaded in a separate extruder, extruded into sheeting through a die, and laminated on both sides of the above prepared 5-fold stretched film to obtain a four-layered laminated film having a structure of C/B/A/B.

The laminated film was cooled to 60° C., reheated up to about 150° C., stretched 7.5 times in the transverse direction by means of a tenter, subjected to annealing at 163° C., cooled to 60° C., and trimmed to obtain composite synthetic paper (B) having a four layer structure (uniaxially stretched film C/uniaxially stretched film B/biaxially stretched film A/uniaxially stretched film B) and a total thickness of 110 μm (C/B/A/B=1 μm/24 μm/60 μm/25 μm). The void content of each constituting layer was C/B/A/B=0%/47%/16/47%.

The same antistatic coating composition as used in Example 1 was coated on the layer C of the composite synthetic paper (B).

A laminated resin sheet was prepared in the same manner as in Example 1, except for using the above prepared laminated base material (A) and composite synthetic paper (B).

The results of evaluation of the resulting laminated resin sheet is shown in Table 1.

EXAMPLE 5

Preparation of Laminated Base Layer (A)

Expandable resin (a$^1$) comprising 100 parts of high-impact polystyrene having an MFR of 2.3 g/10 min ("DIALEX HT516" produced by Mitsubishi Kasei Corporation) and 5 parts of azodicarbonamide as a chemical blowing agent was melt-kneaded in an extruder having a diameter of 65 mm. Separately, non-expandable resin (a$^2$) comprising high-impact polystyrene having an MFR of 4 g/10 min ("DIALEX HT76" produced by Mitsubishi Kasei Corporation) and 20% of calcium carbonate as a filler was melt-kneaded in an extruder having a diameter of 90 mm. Further, an ethylenevinyl acetate copolymer having an MFR of 2.0 g/10 min ("MITSUBISHI POLYETHY EVA EVA41H" produced by Mitsubishi Petrochemical Co., Ltd.) as an adhesive resin was melt-kneaded in an extruder having a diameter of 40 mm. These resins were laminated in a layer structure of adhesive resin/a$^2$/a$^1$/a$^2$ by a feed block process and co-extruded from a T die having a slit width of 750 mm to cause expandable resin (a$^1$) to expand. There was obtained laminated base material (A) composed of adhesive resin layer (20 μm)/non-expanded resin layer A$^2$ (215 μm)/expanded resin layer A$^1$(500 μm; expansion rate: 4.3)/non-expanded resin layer A$^2$(215 μm) having a total thickness of 950 μm.

A laminated resin sheet was prepared in the same manner as in Example 2, except for using the above prepared laminated base material (A). The total thickness of the laminated resin sheet was 1,000.1 μm. The results of evaluation of the resulting laminated resin sheet are shown in Table 1.

COMPARATIVE EXAMPLE 1

A laminated resin sheet was prepared in the same manner as in Example 1, except for replacing the laminated base material (A) as used in Example 1 with a 400 μm thick resin sheet containing an inorganic filler prepared as follows. This resin sheet corresponded to the non-expanded resin layer used in the laminated base material (A) of Example 1. The results of evaluation of the resulting laminated resin sheet are shown in Table 2 below.

Preparation of Inorganic Filler-Containing Resin Sheet

A composition comprising a propylene-ethylene block copolymer having an MFR of 1.8 g/10 min ("MITSUBISHI POLYPRO BC8") and 40% of talc was melt-kneaded in an extruder having a diameter of 90 mm and extruded from a T die having a slit width of 750 mm at 210° C., followed by cooling to obtain an inorganic filler-containing resin sheet having a thickness of 400 μm.

COMPARATIVE EXAMPLE 2

A laminated resin sheet was prepared in the same manner as in Example 1, except for replacing the laminated base material (A) as used in Example 1 with a 400 μm thick expanded resin sheet prepared as follows. This resin sheet corresponded to the expanded resin layer used in the laminated base material (A) of Example 1. The results of evaluation of the resulting laminated resin sheet are shown in Table 2.

Preparation of Expanded Resin Sheet

A composition comprising 100 parts of a propylene-ethylene block copolymer having an MFR of 1.8 g/10 min ("MITSUBISHI POLYPRO EC9") and 3.5 parts of a 1:1 mixture of monosodium citrate and sodium hydrogencarbonate as a blowing agent was melt-kneaded in an extruder having a diameter of 65 mm and extruded from a T die having a slit width of 750 mm to obtain an expanded resin sheet having a thickness of 400 μm (expansion rate: 1.5).

COMPARATIVE EXAMPLE 3

Preparation of Composite Synthetic Paper (B)

A composition comprising 88% of polypropylene having an MFR of 0.8 g/10 min and 12% of calcium carbonate having an average particle size of 1.5 μm was kneaded in an extruder set at 270° C., extruded into sheeting, and cooled in a cooling apparatus to obtain an unstretched sheet.

The resulting sheet was reheated to 140° C. and stretched 5 times in the machine direction to obtain a 5-fold stretched film.

Composition A comprising 49% of polypropylene having an MFR of 4.0 g/10 min, 5% of maleic acid-graft modified polypropylene, and as a filler 46% of calcium carbonate having an average particle size of 1.5 μm (modifying monomer content: 0.05 part per 100 parts of the filler) was kneaded in an extruder set at 270° C. Separately, composition B comprising 55% of polypropylene having an MFR of 4.0 g/10 min and 45% of calcium carbonate having an average particle size of 1.5 μm was melt-kneaded in a separate extruder set at 270° C. These resins were laminated in a T die and laminated on both sides of the above prepared 5-fold stretched film to obtain a 5-layered resin sheet with the modified polypropylene layer as an outer layer. The laminate was heated to 155° C. and stretched 7.5 times in the transverse direction to obtain a 5-layered resin film.

After both sides of the 5-layered resin film were subjected to a corona discharge, the resin film was coated with the same antistatic coating solution as used in Example 1, dried, and wound. The resulting film had a thickness of about 250 μm.

A pair of the 5-layered resin film were bonded together by dry laminating with a polyether polyol-polyisocyanate adhesive coated at a spread of 1 g/m$^2$ to prepare a 10-layered composite sheet having a thickness of 501 μm. The results of evaluation are shown in Table 2.

COMPARATIVE EXAMPLE 4

A composition comprising 60% of a propylene-ethylene block copolymer having an MFR of 1.8 g/10 min ("MITSUBISHI POLYPRO BC8") and 40% of talc as an inorganic filler was melt-kneaded in an extruder having a diameter of 90 mm at 230° C. and extruded from a die having a slit width of 750 mm at 220° C. to obtain an non-expanded inorganic filler-containing resin sheet having a thickness of 500 μm. After both sides of the resin sheet was subjected to a corona discharge, the same antistatic coating solution as used in Example 1 was coated to each side at a single spread of 0.05 g/m$^2$ as converted to a dry basis and dried. The results of evaluation of the resulting resin sheet are shown in Table 2.

COMPARATIVE EXAMPLE 5

A composition comprising 100 parts of a propylene-ethylene block copolymer having an MFR of 0.5 g/10 min ("MITSUBISHI POLYPRO EC9") and as a blowing agent 3.5 parts of a 1:1 mixture of sodium citrate and sodium hydrogencarbonate was melt-kneaded at 210° C. in an extruder having a diameter of 65 mm and extruded at 200° C. from a die having a slit width of 750 mm to cause the resin to expand to obtain an expanded resin sheet (thickness: 500 μm; expansion ratio: 1.5). After both sides of the resin sheet was subjected to a corona discharge, the same antistatic coating solution as used in Example 1 was coated to each side at a single spread of 0.05 g/m$^2$ as converted to a dry basis and dried. The results of evaluation of the resulting resin sheet are shown in Table 2.

TABLE 1

| | Example 1 | Example 2 | Example 3 | Example 4 | Example 5 |
|---|---|---|---|---|---|
| Layer Structure: | | | | | |
| Surface Layer | composite synthetic paper | composite synthetic paper | composite synthetic paper | composite synthetic paper | composite synthetic paper |
| Laminated Base Layer | laminated base material | laminated base material | laminated base material | laminated base material | laminated base material |
| Back Layer | composite synthetic paper | | composite synthetic paper | composite synthetic paper | |
| Layer Thickness (μm): | | | | | |
| Surface Layer: | | | | | |
| Paper-like Layer | 12 | 12 | 24 | 1 + 24 | 12 |
| Base Layer | 26 | 26 | 48 | 60 | 26 |
| Paper-like Layer | 12 | 12 | 23 | 25 | 12 |
| Laminated Base Layer: | | | | | |
| Adhesive Layer | | | | | 20 |
| Non-expanded Resin Layer | 100 | 100 | 100 | 300 | 215 |
| Expanded Resin Layer | 200 | 200 | 200 | 1200 | 500 |
| Non-expanded Resin Layer | 100 | 100 | 100 | 300 | 215 |
| Back Layer: | | | | | |
| Paper-like Layer | 12 | | 24 | 1 + 24 | |
| Layer Thickness (μm): | | | | | |
| Base Layer | 26 | | 48 | 60 | |
| Paper-like Layer | 12 | | 23 | 25 | |
| Total Thickness (μm) | 500.2 | 450.1 | 590.2 | 2020.2 | 1000.1 |
| Density (g/cm$^3$) | 0.91 | 0.92 | 0.90 | 0.83 | 0.70 |
| Basis Weight (g/m$^2$) | 455 | 414 | 531 | 1680 | 700 |
| Evaluation: | | | | | |
| Modulus of Elasticity (kgf/cm$^2$): | | | | | |
| MD | 26800 | 27100 | 27400 | 15200 | 21300 |
| TD | 27000 | 26900 | 27000 | 16100 | 20100 |
| Surface Gloss (%) | 16 | 15 | 16 | 84 | 16 |
| Offset Printability: | | | | | |
| Ink Receptivity | good | good | good | good | good |
| Ink Adhesion | good | good | good | good | good |
| Appearance | good | good | good | good | good |
| Thermoformability | good | good | good | good | good |

TABLE 2

| | Compara. Example 1 | Compara. Example 2 | Compara. Example 3 | Compara. Example 4 | Compara. Example 5 |
|---|---|---|---|---|---|
| Layer Structure: | | | | | |
| Surface Layer | composite synthetic paper | composite synthetic paper | | | |
| Laminated Base Layer | inorganic filler-containing sheet | expanded sheet | bonded synthetic paper | inorganic filler-containing sheet | expanded sheet |
| Back Layer | composite synthetic paper | composite synthetic paper | | | |
| Layer Thickness (μm): | | | | | |
| Surface Layer: | | | | | |
| Paper-like Layer | 12 | 12 | | | |
| Base Layer | 26 | 26 | | | |
| Paper-like Layer | 12 | 12 | | | |
| Laminated Base Layer | 400 | 400 | 501 | 500 | 500 |
| Back Layer | | | | | |

TABLE 2-continued

| | Compara. Example 1 | Compara. Example 2 | Compara. Example 3 | Compara. Example 4 | Compara. Example 5 |
| --- | --- | --- | --- | --- | --- |
| Paper-like Layer | 12 | 12 | | | |
| Base Layer | 26 | 26 | | | |
| Paper-like Layer | 12 | 12 | | | |
| Total Thickness ($\mu$m) | 500.2 | 500.2 | 501.2 | 500.2 | 500.2 |
| Density (g/cm$^3$) | 1.17 | 0.65 | 0.82 | 1.25 | 0.60 |
| Basis Weight (g/m$^2$) | 584 | 324 | 411 | 625 | 300 |
| Evaluation: | | | | | |
| Modulus of Elasticity (kgf/cm$^2$): | | | | | |
| MD | 28000 | 7000 | 6800 | 31000 | 7100 |
| TD | 28500 | 7200 | 7400 | 29300 | 6800 |
| Surface Gloss (%) | 16 | 17 | 15 | 48 | 53 |
| Offset Printability: | | | | | |
| Ink Receptivity | good | good | good | medium | poor |
| Ink Adhesion | good | good | good | poor | poor |
| Appearance | good | medium | good | good | poor |
| Thermoformability | medium | poor | poor | good | good |

EXAMPLE 6

Preparation of Synthetic Paper (B)

Composition (A) comprising 81% of polypropylene having an MFR of 0.8 g/10 min (melting point: about 164°–167° C.), 3% of high-density polyethylene, and 16% of calcium carbonate having an average particle size of 1.5 $\mu$m was kneaded in an extruder set at 270° C., extruded into sheeting, and cooled in a cooling apparatus to obtain an unstretched sheet.

The sheet was reheated to 150° C. and stretched 5 times in the machine direction to obtain a 5-fold stretched film.

The stretched film was heated to 155° C. and stretched 7.5 times in the transverse direction by means of a tenter, subjected to annealing at 165° C., cooled to 60° C., and trimmed to obtain a 45 $\mu$m thick biaxially stretched film (void content: 22%).

After both sides of the biaxially stretched film was subjected to a corona discharge, the same antistatic coating solution as used in Example 1 was coated thereon at a single spread of 0.05 g/m$^2$ as converted to a dry basis (corresponding to a total coating thickness of about 0.1 $\mu$m) and dried, and the film was wound.

Printing

A pattern was printed in multiple colors on the surface of the synthetic paper having been coated with the adhesive (thickness: 45.1 $\mu$m) by litho offset printing.

Preparation of Laminated Base Material (A)

A hundred parts of a propylene-ethylene block copolymer (MFR: 0.5 g/10 min) ("MITSUBISHI POLYPRO EC9") were compounded with 3.5 parts of a 1:1 mixture of monosodium citrate and sodium hydrogencarbonate as a chemical blowing agent to prepare expandable resin (a$^1$). Resin (a$^1$) was melt-kneaded in an extruder (diameter: 65 mm).

Separately, a propylene-ethylene block copolymer (MFR: 1.8 g/10 min) ("MITSUBISHI POLYPRO BC8") was compounded with 40% of talc as a filler to prepare non-expandable resin (a$^2$). Resin (a$^2$) was melt-extruded in an extruder (diameter: 90 mm) at 210° C.

Resins (a$^1$) and (a$^2$) were laminated with (a$^1$) as an intermediate layer and (a$^2$) as an outer layer on each side according to a feed block process, and the three layers were co-extruded from a T die having a 750 mm wide slit to thereby causing the intermediate layer to expand to obtain laminated base material (A) having a total thickness of 400 $\mu$m, with the thickness of non-expanded resin layers (A$^2$) each being 100 $\mu$m, and that of expanded resin layer (A$^1$) 200 $\mu$m.

Preparation of Laminated Resin Sheet

While laminated base material (A) extruded from the T die maintained a soft state, i.e., by the time when the temperature of laminated base material (A) decreased below 180° C. synthetic paper (B) was bonded to both sides thereof by thermal laminating. There was thus obtained a laminated resin sheet composed of synthetic paper (B) (45.1 $\mu$m)/laminated base material (A) (400 $\mu$m; expansion ratio of expanded resin layer (A$^1$): 1.5)/synthetic paper (B) (45.1 $\mu$m) having a total thickness of 490.2 $\mu$m. The results of evaluation of the resulting laminated resin sheet are shown in Table 3 below.

EXAMPLE 7

A laminated resin sheet (thickness: 445.1 $\mu$m) was prepared in the same manner as in Example 6, except that synthetic paper (B) was thermally laminated on only one side of laminated base material (A). The results of evaluations are shown in Table 3.

EXAMPLE 8

Preparation of Laminated Base Material (A)

Expandable resin (a$^1$) comprising 100 parts of linear low-density ethylene polymer having an MFR of 0.7 g/10 min ("MITSUBISHI POLYETHY UE 320") and 2 parts of azodicarbonamide as a chemical blowing agent was melt-kneaded in an extruder having a diameter of 65 mm. Separately, non-expandable resin (a$^2$) comprising 30% of a propylene-ethylene block copolymer having an MFR of 1.8 g/10 min ("MITSUBISHI POLYPRO BC8"), 50% of the same linear low-density ethylene polymer as used in resin (a$^1$), and 20% of talc as a filler was melt-kneaded in an extruder having a diameter of 90 mm. Resins (a$^1$) and (a$^2$) were laminated with the former as an intermediate layer and the latter as an outer layer on both sides in a feed block process and co-extruded from a T die having a slit width of 750 mm to cause the intermediate layer to expand. There was obtained laminated base material (A) composed of non-expanded resin layer (A$^2$)/expanded resin layer ($A^1$) (expansion ratio: 1.5)/non-expanded resin layer ($A^2$) having a total thickness of 1800 μm ($A^2/A^1/A^2$=300 μm/1200 μm/300 μm).

Preparation of Synthetic Paper (B)

Composition (A) comprising 85% of polypropylene having a melt flow rate (MFR) of 0.8 g/10 min (melting point: about 164° to 167° C.), 3% of high-density polyethylene, and 12% of polybutylene terephthalate was kneaded in an extruder set at 270° C., extruded into sheeting, and cooled in a cooling apparatus to obtain an unstretched sheet.

The sheet was heated to 145° C. and stretched 5 times in the machine direction to obtain a 5-fold stretched film.

The stretched film was cooled to 60° C., reheated up to about 150° C., stretched 7.5 times in the transverse direction by means of a tenter, subjected to annealing at 163° C., cooled to 60° C., and trimmed to obtain synthetic paper (B) having a thickness of 150 μm and a void content of 30%.

The same antistatic coating solution as used in Example 1 was coated on the surface of synthetic paper (B).

A laminated resin sheet was prepared in the same manner as in Example 6, except for using the thus obtained laminated base material (A) and synthetic paper (B). The results of evaluation are shown in Table 3.

EXAMPLE 9

Preparation of Laminated Base Material

Expandable resin ($a^1$) comprising 100 parts of high-impact polystyrene having an MFR of 2.3 g/10 min ("DIALEX HT516") and 5 parts of azodicarbonamide as a chemical blowing agent was melt-kneaded in an extruder having a diameter of 65 mm. Separately, non-expandable resin ($a^2$) comprising high-impact polystyrene having an MFR of 4 g/10 min ("DIALEX HT76") and 20% of calcium carbonate as a filler was melt-kneaded in an extruder having a diameter of 90 mm. Further, an ethylene-vinyl acetate copolymer having an MFR of 2.0 g/10 min ("MITSUBISHI POLYETHY EVA EVA41H") as an adhesive resin was melt-kneaded in an extruder having a diameter of 40 mm. These resins were laminated in a layer structure of adhesive resin/$a^2/a^1/a^2$ by a feed block process and co-extruded from a T die having a slit width of 750 mm to cause expandable resin ($a^1$) to expand. There was obtained laminated base material (A) composed of adhesive resin layer (20 μm)/non-expanded resin layer ($A^2$) (215 μm)/expanded resin layer ($A^1$) (500 μm; expansion rate: 4.3)/non-expanded resin layer ($A^2$) (215 μm) having a total thickness of 950 μm.

A laminated resin sheet was prepared in the same manner as in Example 7, except for using the above prepared laminated base material (A). The total thickness of the resulting laminated resin sheet was 995.1 μm. The results of evaluation of the laminated resin sheet are shown in Table 3.

COMPARATIVE EXAMPLE 6

A laminated resin sheet was prepared in the same manner as in Example 6, except for replacing the laminated base material (A) as used in Example 1 with a 400 μm thick resin sheet containing an inorganic filler prepared as follows. This resin sheet corresponded to the non-expanded resin layer used in the laminated base material (A) of Example 6. The results of evaluation of the resulting laminated resin sheet are shown in Table 4 below.

Preparation of Inorganic Filler-Containing Resin Sheet

A composition comprising a propylene-ethylene block copolymer having an MFR of 1.8 g/10 min ("MITSUBISHI POLYPRO BC8") and 40% of talc was melt-kneaded in an extruder having a diameter of 90 mm and extruded from a T die having a slit width of 750 mm at 210° C., followed by cooling to obtain an inorganic filler-containing resin sheet having a thickness of 400 μm.

COMPARATIVE EXAMPLE 7

A laminated resin sheet was prepared in the same manner as in Example 6, except for replacing the laminated base material (A) as used in Example 6 with a 400 μm thick expanded resin sheet prepared as follows. This resin sheet corresponded to the expanded resin layer used in the laminated base material (A) of Example 6. The results of evaluation of the resulting laminated resin sheet are shown in Table 4.

Preparation of Expanded Resin Sheet

A composition comprising 100 parts of a propylene-ethylene block copolymer having an MFR of 0.5 g/10 min ("MITSUBISHI POLYPRO EC9") and 3.5 parts of a 1:1 mixture of monosodium citrate and sodium hydrogencarbonate as a blowing agent was melt-kneaded in an extruder having a diameter of 65 mm and extruded from a T die having a slit width of 750 mm to obtain an expanded resin sheet having a thickness of 400 μm (expansion ratio: 1.5).

COMPARATIVE EXAMPLE 8

Preparation of Synthetic Paper (B)

A composition comprising 88% of polypropylene having an MFR of 0.8 g/10 min and 12% of calcium carbonate having an average particle size of 1.5μm was kneaded in an extruder set at 270° C., extruded into sheeting, and cooled in a cooling apparatus to obtain an unstretched sheet.

The resulting sheet was reheated to 140° C. and stretched 5 times in the machine direction to obtain a 5-fold stretched film. The stretched film was heated to 155° C. and stretched 7.5 times in the transverse direction to obtain synthetic paper (B).

After both sides of synthetic paper (B) was subjected to a corona discharge, the resin film was coated with the same antistatic coating solution as used in Example 1, dried, and wound. The resulting film had a thickness of about 150 μm.

A pair of the resin films were bonded together by dry laminating with a polyether polyol-polyisocyanate adhesive coated at a spread of 1 g/m² to prepare a composite sheet having a thickness of 301.2 μm. The results of evaluation are shown in Table 4.

TABLE 3

| | Example 6 | Example 7 | Example 8 | Example 9 |
|---|---|---|---|---|
| Layer Structure: | | | | |
| Surface Layer | synthetic paper | synthetic paper | synthetic paper | synthetic paper |
| Laminated Base Material | laminated base material | laminated base material | laminated base material | laminated base material |
| Back Layer | synthetic paper | | synthetic paper | |

TABLE 3-continued

|  | Example 6 | Example 7 | Example 8 | Example 9 |
|---|---|---|---|---|
| Layer Thickness (μm): | | | | |
| Surface Layer | 45 | 45 | 150 | 45 |
| Laminated Base Material: | | | | |
| Adhesive Layer | — | — | — | 20 |
| Non-expanded Resin Layer | 100 | 100 | 300 | 215 |
| Expanded Resin Layer | 200 | 200 | 1200 | 500 |
| Non-expanded Resin Layer | 100 | 100 | 300 | 215 |
| Back Layer | 45 | — | 150 | — |
| Total Thickness (μm) | 490.2 | 445.1 | 2100.2 | 995.1 |
| Density (g/cm$^3$) | 0.90 | 0.91 | 0.81 | 0.70 |
| Basis Weight (g/m$^2$) | 441 | 406 | 1700 | 693 |
| Evaluation: | | | | |
| Modulus of Elasticity (kgf/cm$^2$): | | | | |
| MD | 26000 | 25000 | 16000 | 21300 |
| TD | 27000 | 26000 | 16300 | 20100 |
| Surface Gloss (%) | 60 | 58 | 55 | 60 |
| Offset Printability: | | | | |
| Ink Receptivity | good | good | good | good |
| Ink Adhesion | good | good | good | good |
| Appearance | good | good | good | good |
| Thermoformability | good | good | good | good |

TABLE 4

|  | Compara. Example 6 | Compara. Example 7 | Compara. Example 8 |
|---|---|---|---|
| Layer Structure: | | | |
| Surface Layer | synthetic paper | synthetic paper | |
| Laminated Base Material | inorganic filler-containing layer | expanded sheet | synthetic paper |
| Back Layer | synthetic paper | synthetic paper | |
| Layer Thickness (μm): | | | |
| Surface Layer | 45 | 45 | |
| Laminated Base Material | 400 | 400 | 301 |
| Back Layer | 45 | 45 | |
| Total Thickness (μm): | 490.2 | 490.2 | 301.2 |
| Density (g/cm$^3$) | 1.16 | 0.63 | 0.69 |
| Basis Weight (g/m$^2$) | 570 | 310 | 208 |
| Evaluation: | | | |
| Modulus of Elasticity (kgf/cm$^2$): | | | |
| MD | 28000 | 7000 | 6800 |
| TD | 28500 | 7200 | 7400 |
| Surface Gloss (%) | 62 | 60 | 59 |
| Offset Printability: | | | |
| Ink Receptivity | good | good | good |
| Ink Adhesion | good | good | good |
| Appearance | good | medium | good |
| Thermoformability | medium | poor | poor |

While the invention has been described in detail and with reference to specific examples thereof, it will be apparent to one skilled in the art that various changes and modifications can be made therein without departing from the spirit and scope thereof.

What is claimed is:

1. A laminated resin sheet capable of being thermoformed and having a thickness of from 60 to 5,000 μm, comprising (A) a laminated base material having a three layer sandwich structure composed of (A$^2$) a non-expanded resin layer, (A$^1$) an expanded resin layer and (A$^2$) a non-expanded resin layer, said laminated base material (A) being obtained by a process consisting essentially of co-extrusion of (a$^1$) a thermoplastic resin containing a blowing agent and (a$^2$) a thermoplastic resin containing from 9 to 80% by weight of a filler through a T die, said laminated base material (A) having laminated thereon, on at least one side thereof, void-containing synthetic paper (B) comprising a stretched film of a thermoplastic resin containing an inorganic filler.

2. A laminated resin sheet as claimed in claim 1, wherein said synthetic paper (B) has a void content of from 10 to 60% as calculated according to equation:

$$\text{Void Content (\%)} = (\rho_0 - \rho)/\rho_0 \times 100$$

wherein $\rho_0$ is a density of the unstretched film; and $\rho$ is a density of the stretched film.

3. A laminated resin sheet as claimed in claim 1, wherein said synthetic paper (B) has a density of from 0.50 to 1.0 g/cm$^3$.

4. A laminated resin sheet as claimed in claim 1, wherein said expanded resin layer (A$^1$) has an expansion ratio of from 1.05 to 30.

5. A laminated resin sheet as claimed in claim 1, wherein said laminated resin sheet is obtained by a process consisting of melt-kneading (a$^1$) an expandable resin comprising the thermoplastic resin and the blowing agent and (a$^2$) a non-expandable resin comprising the thermoplastic resin and the filler in separate extruders, leading the resins (a$^1$) and (a$^2$) to the T die, co-extruding the resins (a$^1$) and (a$^2$) from the T die, and, while the co-extruded laminated base material (A) is in a molten state, bonding the void-containing synthetic paper (B) comprising the stretched film of the thermoplastic resin containing the inorganic filler to at least one side of the co-extruded laminated base material (A) by fusion bonding under pressure by means of a metal roll or a rubber roll.

6. A laminated resin sheet as claimed in claim 5, wherein said synthetic paper (B) has a void content of from 10 to 60% as calculated according to equation:

$$\text{Void Content (\%)} = (\rho_0 - \rho)/\rho_0 \times 100$$

wherein $\rho_0$ is a density of the unstretched film; and $\rho$ is a density of the stretched film.

7. A laminated resin sheet as claimed in claim 5, wherein said synthetic paper (B) has a density of from 0.50 to 1.0 g/cm$^3$.

8. A laminated resin sheet as claimed in claim 5, wherein an expanded resin layer made from said expandable resin (a$^1$) has an expansion ratio of from 1.05 to 30.

9. A laminated resin sheet capable of being thermoformed and having a thickness of from 60 to 5,000 μm, comprising (A) a laminated base material having a three layer sandwich structure composed of (A$^2$) a non-expanded resin layer, (A$^1$) an expanded resin layer and (A$^2$) a non-expanded resin layer, said laminated base material (A) being obtained by a process consisting essentially of co-extrusion of (a$^1$) a thermoplastic resin containing a blowing agent and (a$^2$) a thermoplastic resin containing from 9 to 80% by weight of a filler through a T die, said laminated base material (A) having laminated thereon, on at least one side thereof, void-containing synthetic paper (B) having a thickness of from 10 to 300 μm and comprising a biaxially stretched film of a thermoplastic resin containing from 8 to 65% by weight of an inorganic filler in such a manner that the void-containing synthetic paper (B) is positioned as the outermost layer of the laminated resin sheet.

10. A laminated resin sheet as claimed in claim 9, wherein said synthetic paper (B) has a void content of from 10 to 60% as calculated according to equation:

Void Content (%) = $(\rho_0 - \rho)/\rho_0 \times 100$ wherein $\rho_0$ is a density of the unstretched film; and $\rho$ is a density of the stretched film.

11. A laminated resin sheet as claimed in claim 9, wherein said synthetic paper (B) has a density of from 0.50 to 1.0 g/cm.

12. A laminated resin sheet as claimed in claim 9, wherein said expanded resin layer ($A^1$) has an expansion ratio of from 1.05 to 30.

13. A laminated resin sheet capable of being thermoformed and having a thickness of from 100 to 5,000 μm, comprising (A) a laminated base material having a three layer sandwich structure composed of ($A^2$) a non-expanded resin layer, ($A^1$) an expanded resin layer and ($A^2$) a non-expanded resin layer, said laminated base material (A) being obtained by a process consisting essentially of co-extrusion of ($a^1$) a thermoplastic resin containing a blowing agent and ($a^2$) a thermoplastic resin containing from 9 to 80% by weight of a filler through a T die, said laminated base material (A) having laminated thereon, on at least one side thereof, composite synthetic paper (B) having a thickness of from 50 to 500 μm and comprising ($B_1$) a biaxially stretched thermoplastic resin film having voids as a base layer and ($B^2$) a uniaxially stretched thermoplastic resin film containing from 0.1 to 65% by weight of an inorganic filler as a paper-like layer in such a manner that the uniaxially stretched thermoplastic resin film ($B^2$) is positioned as the outermost layer of the laminated resin sheet.

14. A laminated resin sheet as claimed in claim 13, wherein said synthetic paper (B) has a void content of from 10 to 60% as calculated according to equation:

Void Content (%) = $(\rho_0 - \rho)/\rho_0 \times 100$ wherein $\rho_0$ is a density of the unstretched film; and $\rho$ is a density of the stretched film.

15. A laminated resin sheet as claimed in claim 13, wherein said synthetic paper (B) has a density of from 0.50 to 1.0 g/cm.

16. A laminated resin sheet as claimed in claim 13, wherein said expanded resin layer ($A^1$) has an expansion ratio of from 1.05 to 30.

17. A laminated resin sheet as claimed in claim 13, wherein said paper-like layer ($B^2$) of synthetic paper (B) has an inorganic filler content of from 8 to 55% by weight.

* * * * *